Aug. 16, 1955 M. ARDENA 2,715,651
ELECTRIC STORAGE BATTERY
Filed Nov. 21, 1950 2 Sheets-Sheet 2
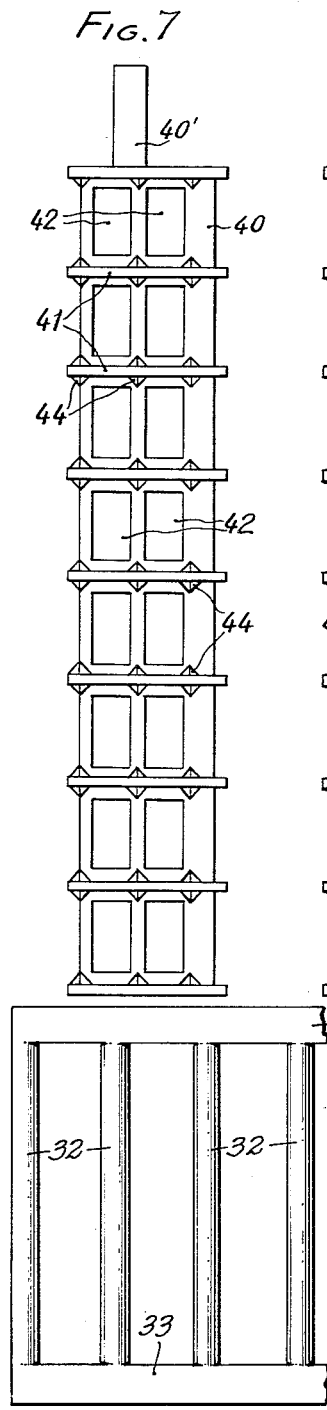
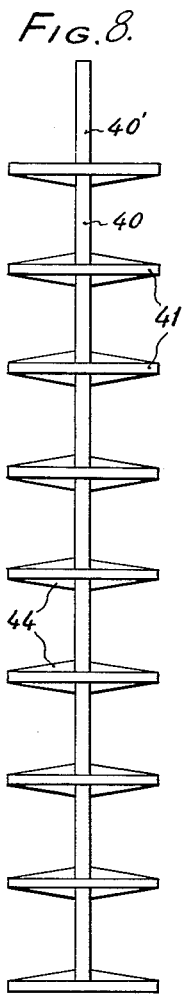
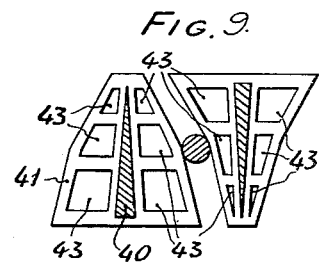
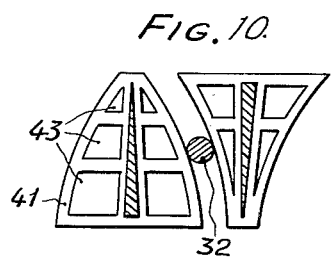
INVENTOR
Manlio Ardena
By
ATTORNEYS

United States Patent Office 2,715,651
Patented Aug. 16, 1955

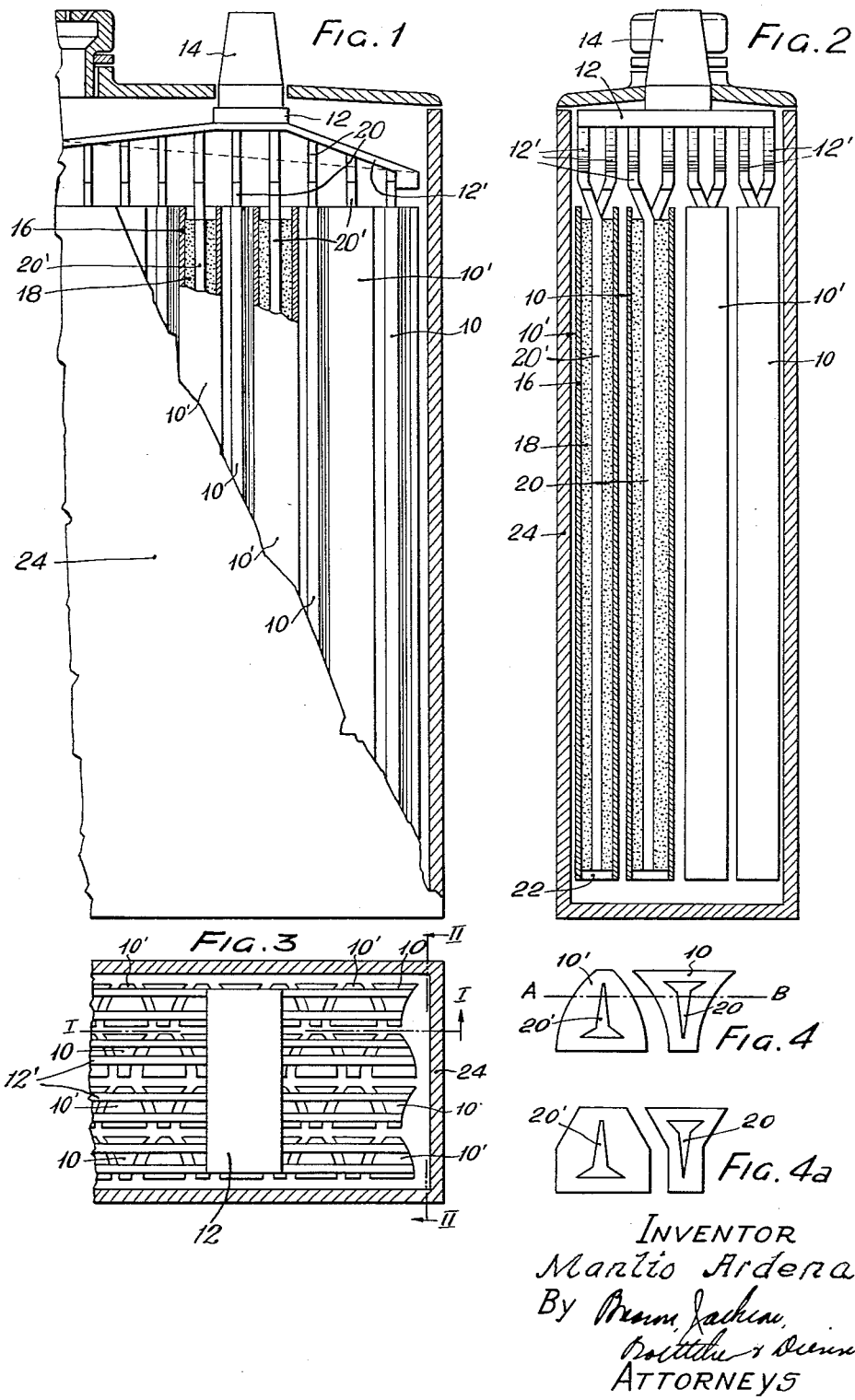

2,715,651

ELECTRIC STORAGE BATTERY

Manlio Ardena, Milan, Italy

Application November 21, 1950, Serial No. 196,751

6 Claims. (Cl. 136—43)

The present invention relates to electric storage batteries and more particularly a light weight, long life and high specific capacity electric battery.

It is known how, for some applications of storage batteries, the heavy weight presented by both the lead type and the iron-nickel type batteries constitutes a severe handicap.

Many attempts have been made to find a solution to this problem, but the results achieved until to date have not been fully satisfactory.

The main object of the present invention is to provide an improved electric storage battery of the type wherein the conventional metallic plates destined to contain the battery active material are constituted by a plurality of porous wall containers for the very active material, in each of which there is arranged, embedded in the active material, a conducting rod.

More precisely, an electric storage battery, in accordance with the present invention, foresees the use of elements or plates each constituted by a plurality of containers for the active material, formed in the shape of prismatic elements, wherein at least some of their faces are concave or convex, elements of adjacent plates being provided with faces complementary relative to each other, the shape of the different elements being such as to result in a larger volume of the positive elements, relative to that of the negative ones, thus obviating the inconvenience deriving from the fact that the positive active paste is more rapidly exhausted than the negative one. The internal conductive rods of all the containers of one polarity, are electrically interconnected at the outside of said containers. There is thus obtained also the advantage, volume and weight being equal, of increasing the life of the battery. In other words, the battery according to the present invention, shall be constituted by alternately positive and negative plates, each constituted by a plurality of elements formed in the way that will be described hereunder, the elements of one plate being however slightly different from those of the other plate, though having a complementary shape, in order to result in a mass of elements of positive polarity larger than that of the elements of negative polarity.

Further, an electric battery according to the invention where the different elements of the plates, have curved faces, involves a larger overall surface to obtain a higher starting capacity, a lower internal resistance of the battery as well as a higher efficiency and a lower heating during charging and discharging cycles.

The internal conducting rods inside each container may have any suitable shape.

An other object of the present invention is also a special separator constituted by a series of small sticks or rods suitably interspaced and interconnected at their ends so as to form a kind of shelf. Such a separator introduced between the elements constituting the plates functions as a spacer and keeps in place the plates and the corresponding elements constituting same.

According to a preferred embodiment of the invention, each of the elements constituting the plates has its internal conductive rod provided with protruding fins perpendicular to it, and having a size and shape practically equal to the internal cross-section of the respective container.

Further, the central rod, that in this case is considerably extended in one direction, as well as the protruding fins fast with same, have apertures to reduce the weight. In this way, there is obtained a conductor which though requiring a minimum quantity of metal, and having thus a minimum weight thanks to its shape, is nevertheless distributed in all of the body of active material so as to carry in the best possible way the electric current and to aid as much as possible the efficient utilisation of the reactions and energies in process.

Further, thanks to the shape of the internal rod, the construction of the elements composing the battery is made easier, while the very elements are also sturdier.

The accompanying drawings illustrate diagrammatically and in the way of an example some forms of embodiment according to the invention:

Fig. 1 is a fragmentary side view, partly in section, taken along the lines I—I and A—B of Figures 3 and 4, of a storage battery according to the invention.

Fig. 2 is a section of same, along a plane indicated by the line II—II of Figure 3, perpendicular to that of Fig. 1, where some of the elements are also shown in section.

Fig. 3 is a partial plan view of the inside of the battery illustrated in Figs. 1 and 2.

Figs. 4 and 4a show diagrammatically in plan, at an enlarged scale, relative to the preceding figures, according to two forms of embodiment, two complementary elements, one positive and the other negative, respectively, of the above battery.

Fig. 5 shows a lateral view of a portion of a separator for the plate elements of the battery illustrated.

Fig. 6 is a plan view of a portion of the battery, wherein there can be clearly seen in place the members of the separator of Fig. 5.

Figs. 7 and 8 represent a preferred form of embodiment of the internal conductive rod, being shaped in the form of a grid, in two longitudinal views reciprocally perpendicular to each other.

Figs. 9 and 10 are cross-sections of two pairs of rods as those shown in Figs. 7 and 8, but whose protruding fins have somewhat different profiles.

As it is apparent from Figures 1, 2, 3, and 4 of the drawing, the storage battery in question is formed, as main elements, by a series of elements 10 and 10′ having practically a prismatic shape, with some curved surfaces such however as to combine with one another so that adjacent fronting surfaces are equidistant. Said elements 10 and 10′, in the case illustrated, have a trapezoidal shape with their non parallel sides, respectively concave and convex. Said concavities and convexities are obtained by means of curved or broken lines. As shown in Fig. 4a said sides may be formed by two segments forming an angle, respectively smaller or greater than 180° or by curved lines, as shown in Fig. 4. They may be distinct and independent from one another, but preferably however they will be alternately combined to form elements, analogous inasfar as their function is concerned, to the conventional storage battery plates, that is all elements 10 will be grouped in several horizontal rows, and those in a same row will be fast to one another, as it will be explained hereunder more in detail; similarly, elements 10′ will be grouped to form the positive plates, while those indicated by 10 will constitue the negative plates.

In the above mentioned preferred cases, the prismatic elements of each plate are constituted by a sheath 16 of insulating material, such as porous rubber, suitable fiber fabrics or the like, suitably bent and secured to the rigid members constituting the very plate, so as to form closed containers, adapted to receive the active material 18, respectively positive and negative, inside each container there being arranged a conductive metallic member 20 or 20', all said conductors being electrically interconnected, that is all those of a same polarity and in a same row being connected to their respective connecting strips 12', which, in turn, are connected to their respective terminal strap 12.

From the above description, it is easily understandable how, due to the complementary shape of elements 10 and 10', the positive elements pertaining to a plate do penetrate into the spaces existing between two continuous elements 10 of the adjacent negative plate. Thus, the development of the active surfaces of the battery is remarkable notwithstanding the reduced total size.

At their lower end, each of elements 10 and 10' is provided with a plug 22 that seals the space enclosed by the insulating sheath 16 of each container, thus preventing the shedding and falling out of the active pastes from the respective containers, an inconvenience which happened frequently with the already known types of batteries, and results in a detriment of the operation of the very battery.

At their upper ends, bars 12 of a same polarity are electrically connected to their respective terminals 14.

All the elements 10 and 10' are positioned inside an insulating casing 24, adapted to contain the electrolyte.

Fig. 5 illustrates a shelf-like spacer formed by a certain number of rods 32 upwardly and downwardly interconnected by means of cross-members 33, said spacers being adapted to be inserted between two series of adjacent elements 10 and 10' taking up the positions clearly shown in Fig. 6.

According to the variant as shown in Figs. 12, 13, 14 and 15, the conducting member arranged inside each element, instead of having the constant prismatic cross-section form illustrated in Figs. 2, 4 and 4a, is constituted by a central portion 40 which traverses longitudinally each prismatic element of the battery and has a height practically equal to that of said elements constituting the battery. In the present instance, said central portion or rod has a triangular cross-section, as it is apparent from Figs. 14 and 15. Said section could however even be trapezoidal or different.

On member 40 there are provided at suitable distances, fins 41 the shape of which is perfectly suited to the cross-section of the elements constituting the battery. Thus, according to the embodiment of the invention shown in Fig. 14, these fins will have a trapezoidal shape with the lateral sides each formed by a broken line having respectively outwardly and inwardly bent edges so as to conform to the corresponding shapes of the battery elements. In Fig. 15 instead, they still have a shape that may still be termed trapezoidal, but with curved lateral sides, respectively convex and concave. The load-carrying rod 40 as well as said fins 41 may be provided with openings to reduce the weight; such apertures or openings are shown with 42, those of the load-carrying rod, and with 43 those of fins 41. Further, said fins may be suitably provided with reinforcing ribs 44.

In this way, the central conductors embedded in the active material and each electrically connected by means of the projection 40' with those elements having the same polarity, carry, as already mentioned, in the best possible manner the electric current, whereby there is obtained a remarkable improvement in the utilisation of the reactions and energy available. Further this last form of conductor facilitates the construction of the elements, and gives the battery a greater sturdiness.

What I claim is:

1. An electric storage battery comprising positive elements having a trapezoidal cross-section with the non-parallel sides being convex and negative elements having a trapezoidal cross-section with the non-parallel sides being concave whereby the elements of the positive plates have a transverse cross-section substantially greater than but complementary of that of the negative plates, the shape of said plates being such as to allow them to be positioned alternately side by side in the relationship of one negative and one positive element, inside of each of said elements there being arranged the corresponding active material, a conductive member embedded in the respective active material, and said conductive members of the same polarity being joined together at their one ends and connected to their respective terminals.

2. A storage battery as under claim 1, in which the positive elements have a trapezoidal cross-section, with the non parallel sides curved and convex, while the negative elements too have a trapezoidal cross-section but with curved concave sides.

3. A storage battery as under claim 1, in which the positive elements have a trapezoidal cross-section with the non parallel sides in broken line with angles forming outwardly protruding edges, while the negative elements too have a trapezoidal cross-section but with sides forming a broken line with inwardly bent edges.

4. An electric storage battery comprising positive elements having a trapezoidal cross-section with the non-parallel sides being convex and negative elements having a trapezoidal cross-section with the non-parallel sides being concave, wherein the elements of the positive plates have a transverse section of substantially greater cross-section but of complementary with that of the negative plates, the shape of said elements being such as to allow them to be positioned alternately side by side in the relationship of one negative and one positive element, inside of each of said elements there being placed the active material wherein there is embedded a conductive member constituted by a central member constituting a rather flat rod the height of which is sufficiently greater than that of the elements constituting the battery to allow the rod to protrude therefrom, said flat rod having transversely disposed and spaced apart fins whose form and dimensions are similar to those of said elements constituting the battery.

5. A storage battery as under claim 4, wherein the central rod of the conductive member has preferably a triangular section so as to suit the cross-section of the elements of the battery.

6. Storage battery as under claim 4, in which the central rod of the conductive member, as well as the protruding fins thereof, are provided with openings to reduce their weight and to allow the passage of the active material.

References Cited in the file of this patent

UNITED STATES PATENTS

| | | |
|---|---|---|
| 309,939 | Faure | Dec. 30, 1884 |
| 462,449 | Palmer | Nov. 3, 1891 |
| 589,042 | Still | Aug. 31, 1897 |
| 745,604 | Hartung | Dec. 1, 1903 |
| 893,330 | Knobloch | July 14, 1908 |
| 1,092,253 | Fuller et al. | Apr. 7, 1914 |
| 2,167,809 | Lubeck | Aug. 1, 1939 |

FOREIGN PATENTS

| | | |
|---|---|---|
| 471,395 | France | Oct. 24, 1914 |